United States Patent

[11] 3,568,041

[72] Inventor Kenjiro Arakane
    Himeji-shi, Japan
[21] Appl. No. 771,489
[22] Filed Oct. 29, 1968
[45] Patented Mar. 2, 1971
[73] Assignee Mitsubishi Denki Kabushiki Kaisha
[32] Priority Nov. 2, 1967
[33] Japan
[31] 42/70,587

[54] ALTERNATOR CONTROL DEVICE HAVING SIMPLIFIED CHARGE-DISCHARGE INDICATOR
9 Claims, 1 Drawing Fig.

[52] U.S. Cl. .................................... 322/28,
    320/48, 322/60, 322/99
[51] Int. Cl. .................................... H02p 9/30
[50] Field of Search .................. 322/28, 60,
    99; 320/48, 67

[56] References Cited
    UNITED STATES PATENTS
    3,086,161   4/1963   DeCarbo et al. ............ 320/67X
    3,173,077   3/1965   Kirk et al. .................. 322/28X
    3,249,846   5/1966   Steinbruegge et al. ....... 322/60X
    3,350,627   10/1967  Wright ......................... 322/28
    3,469,175   9/1969   Kirk ............................. 322/28
    3,477,015   11/1969  Kuhn ............................ 322/28X Primary Examiner—Oris L. Rader
Assistant Examiner—H. Huberfeld
Attorney—Robert D. Flynn ABSTRACT: In an alternator driven by a prime mover of a vehicle to charge a storage battery, a gate controlled rectifier is provided to excite the field winding of the alternator and means responsive to the output voltage of the alternator is provide to effect ON-OFF control of the gate controlled rectifier. To provide initial separate excitation current from the battery, a second excitation circuit including a second gate controlled rectifier is provided which is rendered inoperative as the output voltage of the alternator builds up. A lamp is directly coupled to the second excitation circuit to indicate when separate excitation current is being supplied and that the battery is not being charged.

PATENTED MAR 2 1971  3,568,041
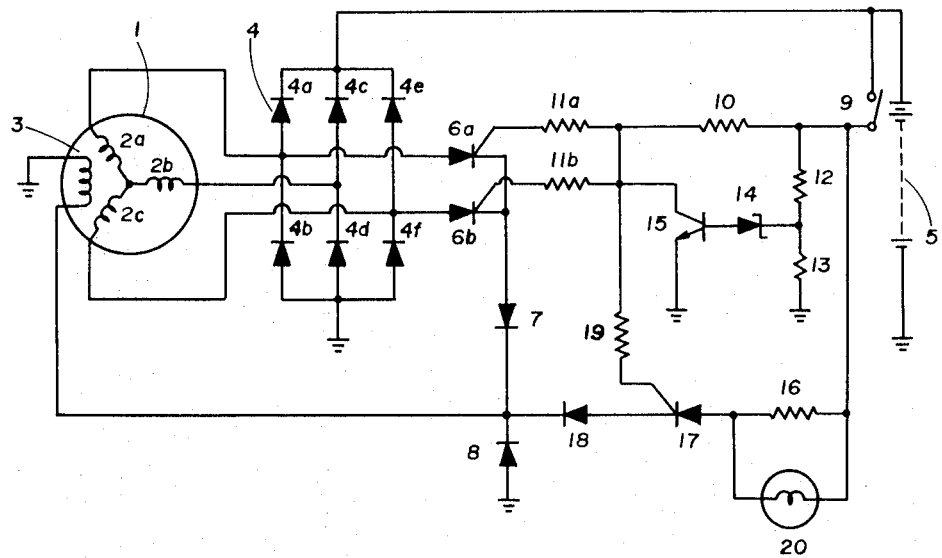

3,568,041

1

ALTERNATOR CONTROL DEVICE HAVING SIMPLIFIED CHARGE-DISCHARGE INDICATOR

BACKGROUND OF THE INVENTION

This invention relates to control devices of generators to be mounted on vehicles such as a motor car, and more particularly to control devices of alternators or AC generators utilized to charge storage batteries or the like.

To charge a storage battery, it is desirable to perform the charging operation at a constant voltage by regulating the output voltage of the generator to a substantially constant value. For this purpose, it is usual to provide a voltage regulator for the generator to regulate its output voltage.

In the prior art, voltage regulators having mechanical contacts have been widely used. These contacts are closed when the output voltage of the generator exceeds a predetermined value to decrease the field current of the generator thus regulating the output voltage at a substantially constant value. However, such voltage regulators utilizing mechanical contacts are erroneous in operation and are of low reliability due to damage of the contact surfaces.

As a result, it has been proposed to utilize contactless switching elements such as transistors, controlled rectifier (Thyristors) and the like. Where controlled rectifiers are used, a turn-off circuit is associated with the controlled rectifiers so as to perform ON-OFF control thereof in accordance with the generator output voltage. However, the construction of the turn-off circuit associated with the controlled rectifiers is relatively complicated because it is necessary to fabricate the turn-off circuit with condensers and the like elements. Especially where it is required to house the voltage regulator in a bracket of the generator, such a construction causes significant troubles. Similar troubles are also encountered where the turn-off circuit is fabricated into an integrated circuit.

The main object of this invention is to provide a new and improved control device for alternators wherein gate controlled rectifiers are utilized to regulate the voltage of the alternators.

Another object of this invention is to provide a new and improved control device wherein voltage regulation is provided by gate controlled rectifiers without the necessity of using a special turn-off circuit.

Still another object of this invention is to provide a new and improved alternator control device wherein gate controlled rectifiers are used tp provide voltage regulation and wherein use is made of a simple circuit capable of supplying initial separate exciting current to the generators.

In car mounted alternators where their field coils are excited by self-exciting current alone, in cases where the number of revolutions of the alternator is low it is not possible to obtain exciting current of sufficient intensity so that the desired value of the output voltage of the generator cannot be attained until a substantially high speed is reached.

The initial separate exciting current assures sufficient exciting current even at low driving speed thus ensuring a desired value of the output voltage sufficient to charge storage batteries, for example, at low driving speed.

Still another object of this invention is to provided a new and improved control device for an alternator wherein gate controlled rectifiers are utilized to provide voltage regulation, a simple circuit is used to supply initial external exciting current to the generator and wherein this separate exciting current is used to light a lamp to indicate the noncharged condition of a storage battery.

SUMMARY OF THE INVENTION

According to this invention a controlled rectifier is connected to receive the output of an alternator to control the field current thereof to regulate the output voltage of the alternator at a substantially constant value. A second switched exciting circuit is provided to supply exciting current from a battery of the field coil. A lamp is directly connected to the second exciting circuit to indicate when it is supplying exciting current and that the battery is not being charged.

BRIEF DESCRIPTION OF THE DRAWING

Other objects and advantages of this invention will be more clearly understood from the following detailed description taken in connection with the accompanying drawing in which a single FIG. shows a connection diagram of one embodiment of this invention.

In the accompanying drawing there is shown a three phase alternator 1 which comprises armature windings 2a, 2b and 2c, a field winding 3 and which is driven by a suitable prime mover such as an internal combustion engine.

Terminals of armature winding 2a, 2b and 2c are connected to neutral points between serially connected diodes 4a, 4b; 4c, 4d; and 4e, 4f. These diodes 4a to 4f comprise a full wave rectifier 4 which provides full wave rectification of the three phase AC output induced in the armature windings 2a, 2b and 2c or the output from alternator 1. One end of terminal of each diodes 4a, 4c and 4f is commonly connected to one terminal of a storage battery 5 while one end terminal of each diode 4b, 4d and 4f is commonly connected together and grounded. The other terminal of the battery 5 is also grounded.

One end of the field winding 3 is grounded while the other end is connected to neutral points between diodes 4a and 4b, and 4e and 4f of the full wave rectifier 4 via gate controlled rectifiers 6a and 6b and a diode 7. In parallel with the field winding 3 is connected a diode 8 for the purpose of absorbing the voltage induced in the field winding 3 when the field current flowing therethrough is interrupted.

A current limiting resistor 10 is connected to the terminal (positive terminal) of the full wave rectifier 4 which is connected to the battery 5, said resistor being connected through a switch 9. The other terminal of the resistor 10 is connected to the gate electrodes of said gate controlled rectifiers 6a and 6b via distribution resistors 11a and 11b, respectively. It is to be understood that the switch 9 is closed during operation.

One end of serially connected adjusting resistors 12 and 13 are connected to the junction between the current limiting resistor 10 and switch 9. The midpoint of adjusting resistors 12 and 13 are connected to the base electrode of a transistor 15 through a Zener diode 14 and the other end is grounded.

The emitter electrode of transistor 15 is grounded while the collector electrode is connected to the junction between distribution resistors 11a and 11b. To the junction between switch 9 and current limiting resistor 10 is connected one end of an initial excitation resistor 16, the other end thereof being connected to the field winding 3 of alternator 1 through a gate controlled rectifier 17 and a diode 18 which are connected in series. The gate electrode of the gate controlled rectifier 17 is connected to the collector electrode of transistor 15 through a distribution resistor 19.

A pilot lamp 20 is connected in parallel with the initial excitation resistor 16 whereby to display voltage buildup of the alternator 1.

The operation of the novel output control device of generators for use on vehicles is as follows: To control alternator 1, switch 9 is closed. Then current is supplied to the gate electrode the gate controlled rectifier 17 through current limiting resistor 10 and distribution resistor 19 from the storage battery 5 which is connected to the full wave rectifier 4, whereby the gate controlled rectifier 17 is rendered conductive. Thus, a separate exciting current is supplied to the field winding 3 of alternator 1 from battery 5 via initial excitation resistor 16, gate controlled rectifier 17 and diode 18, thus starting alternator 1. In response to this exciting current, pilot lamp 20 will be lighted. In this manner voltages are induced in armature windings 2a, 2b and 2c and these induced voltages are applied to the full wave rectifier 4 as the output of alternator 1.

At this time, gate controlled rectifiers 1, a and 6b are also rendered conductive by the current supplied to their gate electrodes from battery 5 through current limiting resistor 10 and distribution resistors 11a and 11b. Consequently, the output of the alternator 1 supplied to full wave rectifier 4 will supply self exciting current to the field winding 3 of alternator 1 through the conductive gate controlled rectifiers 6a and 6b. Then the current that has been flowing through the initial excitation resistor 16 will be blocked, thus distinguishing lamp 20. Thereafter, field winding 3 of the alternator 1 is controlled by the exciting current supplied by gate controlled rectifiers 6a and 6b. Under these conditions the DC output of the full wave rectifier 4 is supplied to the storage battery 5 to charge it.

When the output voltage of the alternator 1 exceeds a predetermined level, the voltage drop across adjusting resistor 13 will exceed the Zener voltage of the Zener diode 14 thereby rendering it conductive, this in turn renders transistor 15 conductive. As a result, the current that has been flowing to the gate electrodes of gate controlled rectifier 6a and 6b through current limiting resistor 10 and distribution resistors 11a and 11b will be bypassed to ground through the collector emitter path of the transistor 15. Thus, gate controlled rectifiers 6a and 6b are rendered nonconductive thereby interrupting the exciting current to the field winding 3 of the alternator 1. Concurrently, therewith, gate controlled rectifier 17 is also rendered in its off state to interrupt exciting current. As a result, the output voltage of the alternator 1 decreases and when it reaches a predetermined value, the voltage drop across adjusting resistor 13 will become smaller than the Zener voltage of the Zener diode 14 to cut off transistor 15. Then current is supplied again to the gate electrodes of gate controlled rectifiers 6a and 6b through current limiting resistor 10 and distribution resistors 11a and 11b whereby these gate controlled rectifiers are rendered conductive to supply the exciting current to the field winding 3 of the alternator 1. By repeating these operations, the storage battery 5 can be charged at a substantially constant voltage.

In this embodiment, the desired value of the output voltage can be determined at any value by proper selection of the value of adjusting resistors 12 and 13 and the characteristic of Zener diode 14.

While the invention has been shown and described in terms of a preferred embodiment, it should be understood that the invention is not limited thereto and that many changes and modification may be made without departing from the true spirit and scope of the invention as defined in the appended claims.

I claim:

1. A control device for a rotatably driven AC generator having an armature winding and a field coil, and which selectively charges a storage battery, comprising:
   a full wave rectifier circuit connected to the armature winding of said AC generator;
   a first exciting circuit including a gate controlled rectifier coupling the output of said armature winding to the field coil of said AC generator to selectively supply exciting current from the armature winding to the field coil;
   a second exciting circuit including a first switching element for selectively supplying exciting current from the storage battery to the field coil, said first switching element controlling the operation of said second exciting circuit;
   a second switching element connected to both said first and second exciting circuits for controlling both said gate controlled rectifier and said first switching element to thereby control said first and second exciting circuits, said second switching element turning off both said first and second exciting circuits when the output voltage of said full wave rectifier circuit reaches a predetermined value; and
   a pilot lamp directly coupled in said second exciting circuit and responsive to exciting current flowing in said second exciting circuit for indicating (1) when said storage battery is supplying exciting current and is not being charged by the output of said full wave rectifier circuit, and (2) when said storage battery is not supplying exciting current via said second exciting circuit and when said storage battery is being charged.

2. A device according to claim 1, wherein said lamp is lit when said storage battery is supplying exciting current and is not being charged by the output of said full wave rectifier circuit, and is extinguished when said storage battery is not supplying exciting current via said second exciting circuit and when said storage battery is being charged.

3. A device according to claim 1, wherein said AC generator is a three phase AC generator, and wherein said full wave rectifier is a three phase full wave rectifier.

4. A device according to claim 2, wherein said first switching element includes a gate controlled rectifier having its gate electrode coupled to the second switching element, the second switching element selectively turning off the first switching element.

5. A device according to claim 1, wherein the second switching element comprises a transistor.

6. A device according to claim 5, wherein said transistor is coupled to the gate electrode of said gate controlled rectifier.

7. A device according to claim 4, wherein said second switching element includes a transistor coupled to the gate electrodes of said gate controlled rectifiers.

8. A device according to claim 4, wherein said second exciting circuit includes a resistance element coupled in series with said first switching element, said pilot lamp being directly coupled in parallel with said resistance element.

9. A device according to claim 4 including means coupling said first and second exciting circuits to said field coil so that exciting current supplied via said second exciting circuit is turned off as the exciting current supplied via said first exciting circuit increases.